United States Patent
Qian et al.

(10) Patent No.: US 8,331,914 B2
(45) Date of Patent: Dec. 11, 2012

(54) METHOD FOR SETTING COLORING RING BACK TONE

(75) Inventors: Aihua Qian, Beijing (CN); Feng Chen, Beijing (CN)

(73) Assignee: Sony Ericsson Mobile Communications AB, Lund (SE)

( * ) Notice: Subject to any disclaimer, the term of this patent is extended or adjusted under 35 U.S.C. 154(b) by 244 days.

(21) Appl. No.: 12/860,268

(22) Filed: Aug. 20, 2010

(65) Prior Publication Data

US 2011/0201316 A1 Aug. 18, 2011

(30) Foreign Application Priority Data

Feb. 12, 2010 (CN) .......................... 2010 1 0109520

(51) Int. Cl.
*H04M 3/42* (2006.01)
(52) U.S. Cl. ...................... 455/414.1; 455/567; 455/401; 379/207.16; 379/373.01
(58) Field of Classification Search ............... 455/414.1, 455/567, 401
See application file for complete search history.

(56) References Cited

U.S. PATENT DOCUMENTS

| | | | |
|---|---|---|---|
| 7,512,421 B2 * | 3/2009 | Kim et al. ...................... | 455/567 |
| 2006/0153355 A1 | 7/2006 | Wang et al. | |
| 2008/0311895 A1 * | 12/2008 | Feng et al. ................. | 455/414.2 |

OTHER PUBLICATIONS

International Search Report and Written Opinion of corresponding International Application No. PCT/IB2011/000176, dated Jun. 27, 2011.

* cited by examiner

*Primary Examiner* — Vladimir Magloire
(74) *Attorney, Agent, or Firm* — Renner, Otto, Boisselle & Sklar, LLP

(57) ABSTRACT

The invention relates to a method for setting a CRBT, including: initiating a call to a called terminal and receiving a CRBT sent from a CBC, by a calling terminal in a communication network; during the process of playing the CRBT or the communication process or after the call is ended, authenticating the calling terminal by the communication network in response to a CRBT setting request message sent by the calling terminal or the called terminal actively or upon an inquiry, so as to judge whether the calling terminal activated a CRBT service; if it is judged that the calling terminal has not activated a CRBT service, sending, by the communication network, a CRBT service activation message to the calling terminal to instruct the calling terminal to subscribe the CRBT service, and then subscribing, by the calling terminal, the CRBT service through a response to the message; and if it is judged the calling terminal already activated the CRBT service, or the CRBT service is activated by the calling terminal responding to the CRBT service activation message, instructing, by the communication network, the CBC to set a CRBT same as or similar to or associated with the CRBT received by the calling terminal into a CRBT library for the calling terminal.

19 Claims, 6 Drawing Sheets

METHOD FOR SETTING COLORING RING BACK TONE

FIELD OF THE INVENTION

The present invention relates to a method for setting Coloring Ring Back Tone (CRBT), and particularly to, in a communication network, copying a CRBT subscribed by a called terminal and being played into a CRBT library for a calling terminal, as the CRBT to be only received by the called terminal when the called terminal calls the calling terminal, and/or setting a CRBT similar to or associated with the CRBT subscribed by the called terminal and being played into the CRBT library for the calling terminal, as the CRBT to be received by all other terminals that call the calling terminal or only received by the called terminal, wherein the CRBT may be an audio CRBT or a video CRBT.

BACKGROUND OF THE INVENTION

In recent years, personalized CRBTs are widely used in communications. With such technology, when a calling subscriber calls the mobile phone number of a called subscriber, he or she can hear a piece of euphonic music or a greeting, instead of the traditional ring back tone "du, du". Thus the calling process is relaxed and interesting, which is helpful to relieve the anxious mood of the calling subscriber when waiting for a connection.

Typically, the called subscriber for example can apply for the CRBT service by himself or herself in the service hall (e.g., service provider company, service provider store or other store, whether physical store or online store, other store at which CRBT service and/or software or the like can be obtained, and so on), and at the same time, select different CRBTs for different calling subscriber groups. But it will take the called subscriber's time, and is inconvenient for the called subscriber to change new CRBTs according to his or her preference or mood variation. Alternatively, the called subscriber can apply for the service and set a CRBT on a website that provides CRBT download. By comparison, this method makes great improvements in CRBT audition and change. But the called subscriber shall login the special website and spend time in auditioning many CRBTs to make a selection. Particularly, when the called subscriber cannot login the Internet, e.g., being on a trip, he or she will not set or update the CRBT.

In actual life, when calling the called subscriber, the calling subscriber often hears a very fair-sounding or interesting CRBT subscribed by the called subscriber, and he or she will also want to subscribe such CRBT or the like as his or her own CRBT. At that time, if in the traditional way, the calling subscriber shall specially go to the service hall or login the website to subscribe the CRBT, he or she will not easily find the CRBT in many cases.

Or, there is a special relationship between the calling subscriber and the called subscriber, such as family, lover or close friend relationship. When the calling subscriber hears the CRBT subscribed by the called subscriber during the process of calling the called subscriber, in order to reflect their close relationship, he or she also wants to subscribe the same or similar CRBT specially for the called subscriber, so that the called subscriber will be aware of their close relationship through the heard CRBT when calling the calling subscriber.

Thus there is a need to be able conveniently to set for the calling subscriber, a CRBT of the called subscriber received by the calling subscriber, during a CRBT playing process, a communication process or after a call is ended.

SUMMARY OF THE INVENTION

The present invention is provided with respect to the above problems in the prior art. According to an aspect of the present invention, a method for setting a CRBT is provided so that a calling subscriber or a called subscriber can set the CRBT received when the calling subscriber calls the called subscriber, or a CRBT similar to or associated with the received CRBT, into a CRBT library for the calling subscriber, and preferably can set the CRBT to be received only by the called subscriber when the called subscriber calls the calling subscriber.

A first aspect of the invention provides a method for setting a Coloring Ring Back Tone (CRBT), including:

initiating a call to a called terminal and receiving a CRBT subscribed by the called terminal sent from a CRBT Service Center (CBC), by a calling terminal in a communication network;

during the process of playing the CRBT or the communication process or after the call is ended, authenticating the calling terminal by the communication network in response to a CRBT setting request message sent by the calling terminal or the called terminal actively or upon an inquiry from the communication network, so as to judge whether the calling terminal already activated a CRBT service;

if it is judged in the step of authenticating that the calling terminal has not activated a CRBT service, sending, by the communication network, a CRBT service activation message to the calling terminal to instruct the calling terminal to activate the CRBT service, and then activating, by the calling terminal, the CRBT service through a response to the CRBT service activation message, or sending, by the communication network, to the called terminal a message about activating the CRBT service for the calling terminal, and then activating, by the called terminal, the CRBT service for the calling terminal through a response to the message; and if it is judged in the step of authenticating that the calling terminal already activated the CRBT service, or the CRBT service is activated for the calling terminal in the step of activating the CRBT service, instructing, by the communication network, the CBC to set a CRBT same as or similar to or associated with the CRBT received by the calling terminal into a CRBT library for the calling terminal.

A second aspect of the invention provides a method based on the first aspect, wherein the CRBT setting request message is a message sent, during the calling process, through pressing a specific key of the calling terminal or the called terminal, or operating on a specific menu of the calling terminal or the called terminal, or upon the setting of the calling terminal or the called terminal, and the message instructs to copy a CRBT same as that received by the calling terminal into the CRBT library for the calling terminal, and set the CRBT to be only received by the called terminal when the called terminal calls the calling terminal.

A third aspect of the invention provides a method based on the first aspect, wherein the CRBT setting request message is sent by the calling terminal or the called terminal responding to an inquiry message from the communication network after the call is ended, wherein the inquiry message prompts whether to set a CRBT same as or similar to or associated with that received by the calling terminal into the CRBT library for the calling terminal.

A fourth aspect of the invention provides a method based on the third aspect, wherein the CRBT setting request message instructs to copy a CRBT same as that received by the calling terminal into the CRBT library for the calling terminal, and set the CRBT to be only received by the called terminal when the called terminal calls the calling terminal.

A fifth aspect of the invention provides a method based on the second or fourth aspect, wherein in the step of setting the CRBT, the CBC copies the CRBT same as that received by the calling terminal into the CRBT library for the calling terminal, and sets the CRBT to be only received by the called terminal when the called terminal calls the calling terminal.

A sixth aspect of the invention provides a method based on the third aspect, wherein the CRBT setting request message instructs to copy a CRBT similar to or associated with that received by the calling terminal into the CRBT library for the calling terminal.

A seventh aspect of the invention provides a method based on the sixth aspect, wherein in the step of setting the CRBT, the CBC copies the CRBT similar to or associated with that received by the calling terminal into the CRBT library for the calling terminal.

A eighth aspect of the invention provides a method based on the sixth aspect, wherein the CRBT setting request message further instructs to set the CRBT similar to or associated with that received by the calling terminal to be only received by the called terminal when the called terminal calls the calling terminal.

A ninth aspect of the invention provides a method based on the eighth aspect, wherein in the step of setting the CRBT, the CBC sets the CRBT similar to or associated with that received by the calling terminal into the CRBT library for the calling terminal, and sets the CRBT to be only received by the called terminal when the called terminal calls the calling terminal.

A tenth aspect of the invention provides a method based on the first aspect, wherein in the step of setting the CRBT, the CBC sets a serial number of the CRBT same as similar to or associated with that received by the calling terminal to the CRBT library for the calling terminal.

An eleventh aspect of the invention provides a method based on the first aspect, wherein the step of authenticating is performed by the CBC.

A twelfth aspect of the invention provides a method based on the eleventh aspect, wherein the step of authenticating includes:

searching, by the CBC, in a database thereof based on the telephone number of the calling terminal, and if the telephone number of the calling terminal exists in the database, judging that the calling terminal already activated the CRBT service, otherwise judging that the calling terminal has not activated the CRBT service.

A thirteenth aspect of the invention provides a method based on any one of the preceding aspects, after the step of setting the CRBT, further including:

sending, by the CBC, a CRBT setting success message to the calling terminal or the called terminal.

A fourteenth aspect of the invention provides a method based on the first aspect, wherein the communication network is a mobile communication network, and the calling terminal and the called terminal are mobile communication terminals.

A fifteenth aspect of the invention provides a method based on the fourteenth aspect, wherein the step of authenticating includes:

detecting, by a mobile switching center of the calling terminal, a home location register of the calling terminal to judge whether the calling terminal already activated the CRBT service.

A sixteenth aspect of the invention provides a method based on the first aspect, wherein the called terminal is charged for the CRBT service activation fee in case that the CRBT setting request message is sent by the called terminal.

A seventeenth aspect of the invention provides a method based on the first aspect, wherein in the step of activating the CRBT service, after the called terminal responds to the CRBT service activation message so as to activate the CRBT service for the calling terminal, the CBC further sends a message to the calling terminal to require the calling terminal to determine whether to activate the CRBT service, and after the calling terminal responds with a message to decide to activate the CRBT service, activates the CRBT service for the calling terminal.

An eighteenth aspect of the invention provides a method based on the first aspect, wherein the CRBT is an audio CRBT or a video CRBT.

A nineteenth aspect of the invention provides a method based on the first aspect, wherein the communication network is a fixed-line telephone network, and the calling terminal and the called terminal are fixed-line telephone terminals.

In addition, a computer program for implementing the above methods and a computer-readable medium containing the computer program are also provided.

According to the above aspects of the present invention, a CRBT can be set conveniently for the calling subscriber, and it is not necessary for the calling subscriber to specially spend time in auditioning CRBTs. Meanwhile, a CRBT same as that of the called subscriber listened during the call can be set conveniently for the calling subscriber, and such CRBT can only be received by the called subscriber when it calls the calling subscriber. Furthermore, a CRBT similar to or associated with that of the called subscriber listened during the call can be set conveniently for the calling subscriber.

BRIEF DESCRIPTION OF THE DRAWINGS

The accompanied drawings are provided for further understanding of the present invention, and constitute a part of the specification. The drawings illustrate the preferred embodiments of the present invention, and are used to explain the principle of the present invention together with the description, wherein the same element is always represented by the same reference numeral. In the drawings.

DETAILED DESCRIPTION OF THE EMBODIMENTS

Those and other aspects of the present invention will be clear in reference to the following descriptions and drawings. These descriptions and drawings specifically disclose some specific embodiments of the present invention to reflect certain ways for implementing the principle of the present invention. But it shall be appreciated that the scope of the present invention is not limited thereby. On the contrary, the present invention includes all changes, modifications and equivalents falling within the range of spirit and connotation of the accompanied claims.

Features described and/or illustrated with respect to an embodiment can be used in the same way or similar way in one or more other embodiments, and/or in combination with the features of other embodiment or replace the features of other embodiment.

To be emphasized, the terms "include/including" or "comprise/comprising" used in the present invention mean presence of the stated feature, integer, step or component, not excluding the presence or addition of one or more other features, integers, steps, components or a group thereof.

A mobile communication network is taken as an example to describe the embodiments of the present invention as follows. But it is appreciated to a person skilled in the art that, the CRBT service is not limited to the mobile communication network, and a fixed-line telephone network can also use the CRBT service, and thus the present invention also covers applications in the fixed-line telephone network. In addition, the CRBT is typically an audio CRBT, but a video CRBT can also be used for a visual telephone terminal. The setting applications of an audio CRBT and a video CRBT are both covered by the present invention. In the following descriptions, the CRBT may be either an audio CRBT or a video CRBT, unless otherwise specified.

Figure 1:
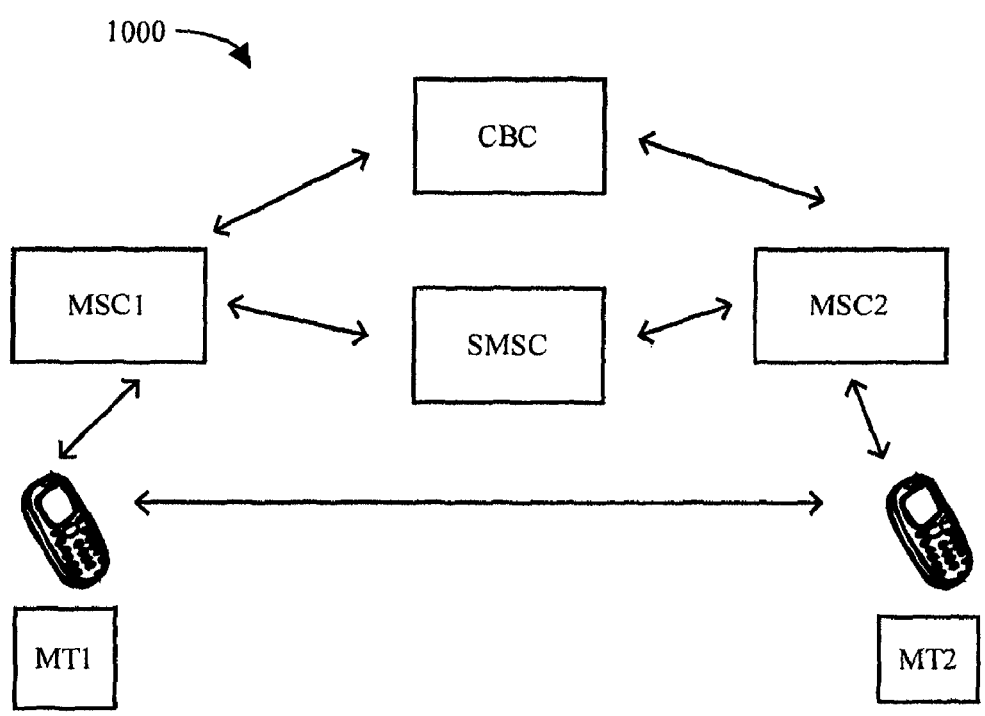
FIG. 1 illustrates the configuration of a part of a mobile communication network related to the present invention.

First of all, the configuration of a part of a mobile communication network related to the present invention is described as follows in reference to FIG. 1.

The mobile communication network includes a calling mobile terminal MT1, a called mobile terminal MT2, a first mobile switching center MSC1, a second mobile switching center MSC2, a CRBT service center CBC and a short message service center SMSC.

The CBC is configured to store and manage CRBT resources. The SMSC is configured to send information to MT1 and MT2.

Figure 2:
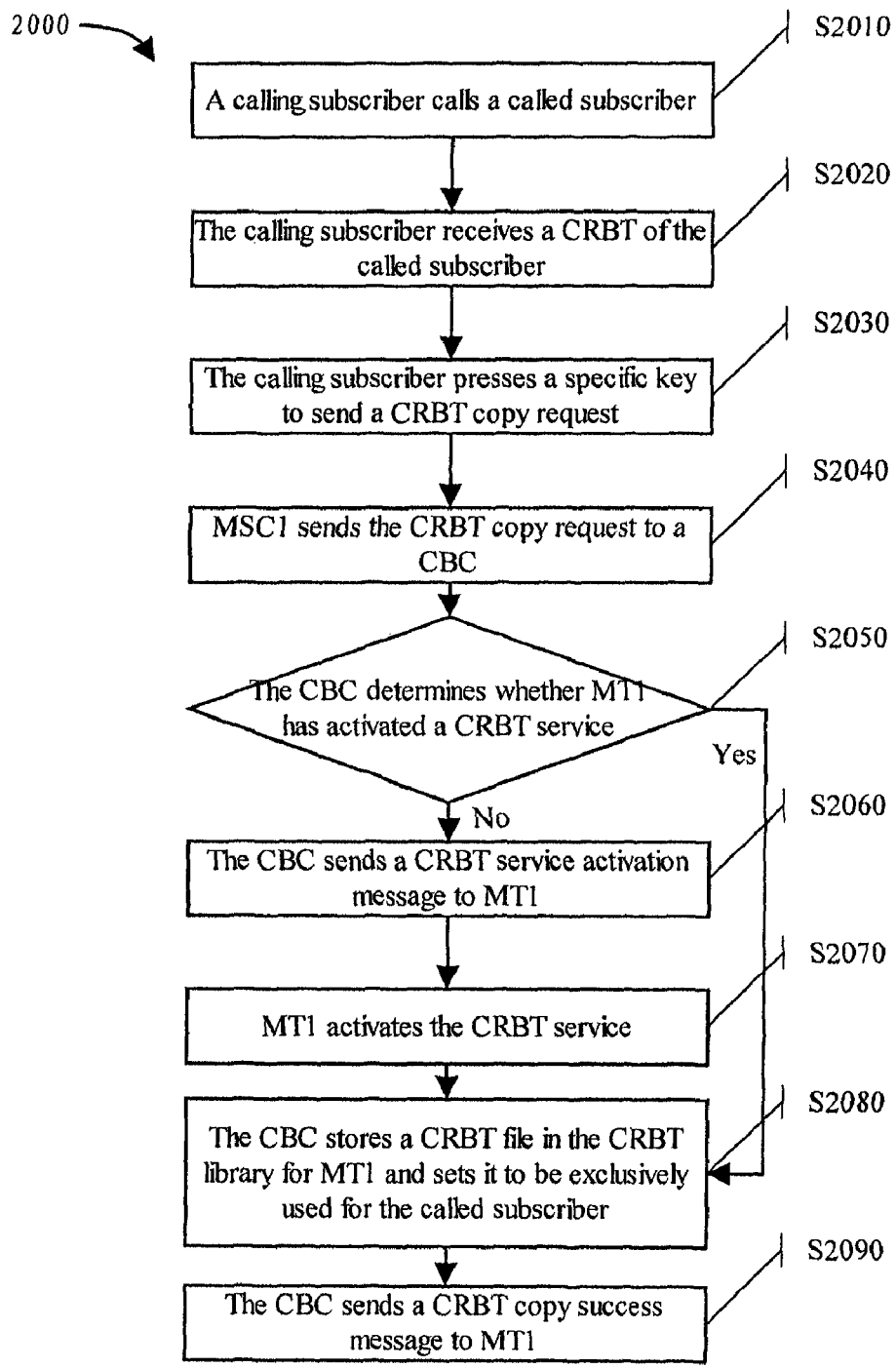
FIG. 2 illustrates a flowchart of a method for copying a CRBT according to a first embodiment of the present invention.

Next, the first embodiment of the present invention is described in reference to flowchart 2000 of FIG. 2.

Firstly, in step S2010, MT1 initiates a call to MT2 via MSC1 and MSC2.

Next, in step S2020, MT1 receives a CRBT played by the CBC since MT2 already subscribed a CRBT service.

Next, in step S2030, during the process of playing the CRBT or during the subsequent communication process, if the calling subscriber likes the CRBT of the called subscriber, or considers the special relationship therebetween such as family, lover or close friend relationship, and hence wants to copy the CRBT of the called subscriber so that the called subscriber can hear the same CRBT when calling the calling subscriber, the calling subscriber for example can press a special key (e.g., "*" key) on MT1 to send a CRBT copy request message, which contains the phone number of MT1, to instruct to copy the CRBT just heard by the calling subscriber into a CRBT library for MT1, and set the CRBT to be received only by MT2 when it calls MT1. Alternatively, in this step, the CRBT copy request message can be sent by operating on the menu of MT1. Alternatively, for example, MT1 may automatically send the CRBT copy request message based on for example the settings in the contact list of MT1, in which, for example, the phone number of MT2 is set in a certain specific relationship such as family, lover or close friend relationship, and tracking of the CRBT of MT2 is set.

Next, in step S2040, MSC1 receives the CRBT copy request message sent by MT1, and forwards it to the CBC.

Next, in step S2050, after receiving the CRBT copy request message, the CBC authenticates MT1 to judge whether MT1 already activated the CRBT service. Specifically, the CBC can search the phone number of MT1 in its database, and if the number is found, it means that MT1 already activated the CRBT service, otherwise MT1 has not activated the CRBT service. If the judgment result is "Yes", i.e., MT1 already activated the CRBT service, the procedure will go to step S2080, and if the judgment result is "No", the procedure will go to step S2060.

In step S2060, the CBC sends a CRBT service activation message to MT1.

Next, in step S2070, MT1 activates the CRBT service by responding to the CRBT service activation message sent by the CBC.

Next, in step S2080, the CBC stores a CRBT file into the CRBT library for MT1, for example, preferably associates the serial number of the CRBT file with the phone number of MT1, and sets the CRBT file to be received only by MT2.

Next, after the CRBT is copied, the CBC can send a CRBT copy success message to MT1 in step S2090.

In this embodiment, MT1 and MT2 may belong to the same MSC. In this case, the CRBT copying procedure is the same as the above procedure.

Thus, according to the embodiment, when calling the called subscriber, the calling subscriber can copy the CRBT of the called subscriber into the CRBT library for the calling subscriber himself or herself, and set the CRBT to be received only by the called subscriber. This saves the process that the calling subscriber specially auditions and selects the CRBT, and the CRBT synchronization makes two parties in communication feel amiable.

Figure 3:
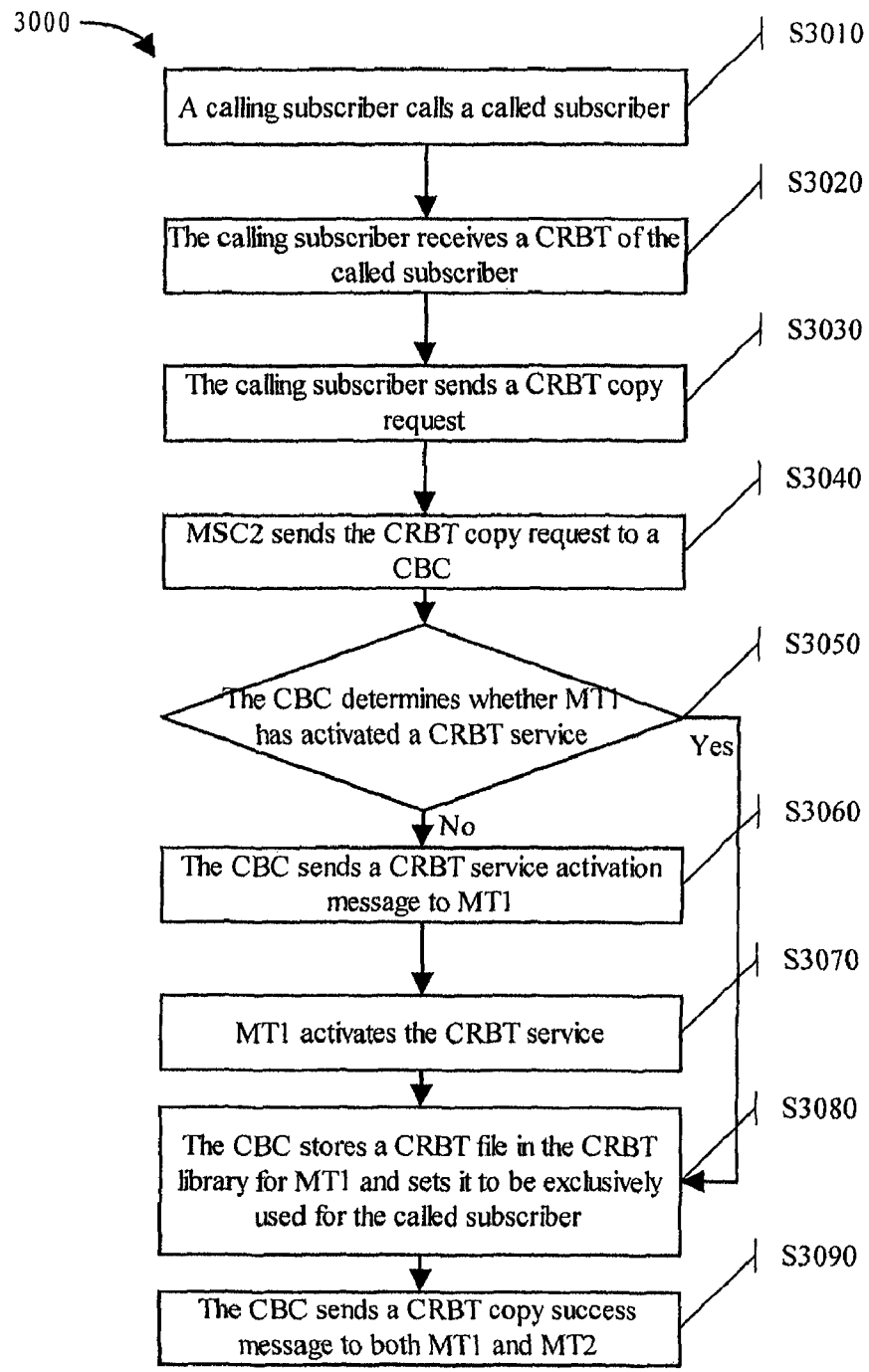
FIG. 3 illustrates a flowchart of a method for copying a CRBT according to a second embodiment of the present invention.

Next, the second embodiment of the present invention is described in reference to flowchart 3000 of FIG. 3. The second embodiment differs from the first embodiment mainly in that the CRBT copy request message is sent by the called subscriber, rather than by the calling subscriber.

Firstly, in step S3010, MT1 initiates a call to MT2 via MSC1 and MSC2.

Next, in step S3020, MT1 receives the CRBT played by the CBC since MT2 already subscribed a CRBT service.

Next, in step S3030, during the communication process, if the calling subscriber says that he or she likes the CRBT of the called subscriber, or the called subscriber considers the special relationship therebetween such as family, lover and close friend relationship, and hence wants to copy his or her CRBT to the calling subscriber so that the called subscriber can hear the same CRBT when calling the calling subscriber, the called subscriber for example can press a special key (e.g., "#" key) on MT2 to send a CRBT copy request message, which contains the phone number of MT1, and instructs to copy the CRBT just heard by the calling subscriber into the CRBT library for MT1, preferably associate the serial number of the CRBT with the phone number of MT1, and set the CRBT to be received only by MT2 when it calls MT1. Alternatively, in this step, the CRBT copy request message may be sent by operating on the menu of MT2. Still alternatively, for example, MT2 may automatically send the CRBT copy request message during the process of playing the CRBT or during the communication process based on for example the settings in the contact list of MT2, in which, for example, the phone number of MT1 is set in a certain specific relationship such as family, lover or close friend relationship.

Next, in step S3040, MSC2 receives the CRBT copy request message sent by MT2, and forwards it to the CBC.

Next, in step S3050, after receiving the CRBT copy request message, the CBC authenticates MT1 to judge whether MT1 already activated the CRBT service. Specifically, the CBC can search the phone number of MT1 in its database, and if the number is found, it means that MT1 already activated the CRBT service, otherwise MT1 has not activated the CRBT service. If the judgment result is "Yes", i.e., MT1 already activated the CRBT service, the procedure will go to step S3080, and if the judgment result is "No", the procedure will go to step S3060.

In step S3060, the CBC sends a CRBT service activation message to MT1. Preferably, the CRBT service activation message simultaneously indicates that MT2 will copy the CRBT just played for MT1.

Next, in step S3070, MT1 activates the CRBT service by responding to the CRBT service activation message sent by the CBC.

Next, in step S3080, the CBC stores a CRBT file into the CRBT library for MT1, preferably associates the serial number of the CRBT file with the phone number of MT1, and preferably further sets the CRBT file to be received only by MT2.

Next, after the CRBT is copied, the CBC can send a CRBT copy success message to MT1 and MT2 in step S3090.

In this embodiment, MT1 and MT2 may belong to the same MSC. In such case, the CRBT copying procedure is the same as the above procedure.

Thus, according to the embodiment, when the calling subscriber calls the called subscriber, the called subscriber can copy the CRBT of the called subscriber into the CRBT library for the calling subscriber, based on the calling subscriber's evaluation on the just heard CRBT or the relationship between the two parties, and preferably further set the CRBT to be received only by the called subscriber. This saves the process that the calling subscriber specially auditions and selects a CRBT, and the CRBT synchronization makes two parties in communication feel amiable.

In this embodiment, it is defaulted that the called subscriber is chargeable. Alternatively, the calling subscriber may also be chargeable. For example, before the CRBT copy is completed, a CRBT copy confirming and charging message can be sent to MT1 and/or MT2 by the CBC to require a corresponding response, so as to determine which party will finally pay for the CRBT copy.

Figure 4:
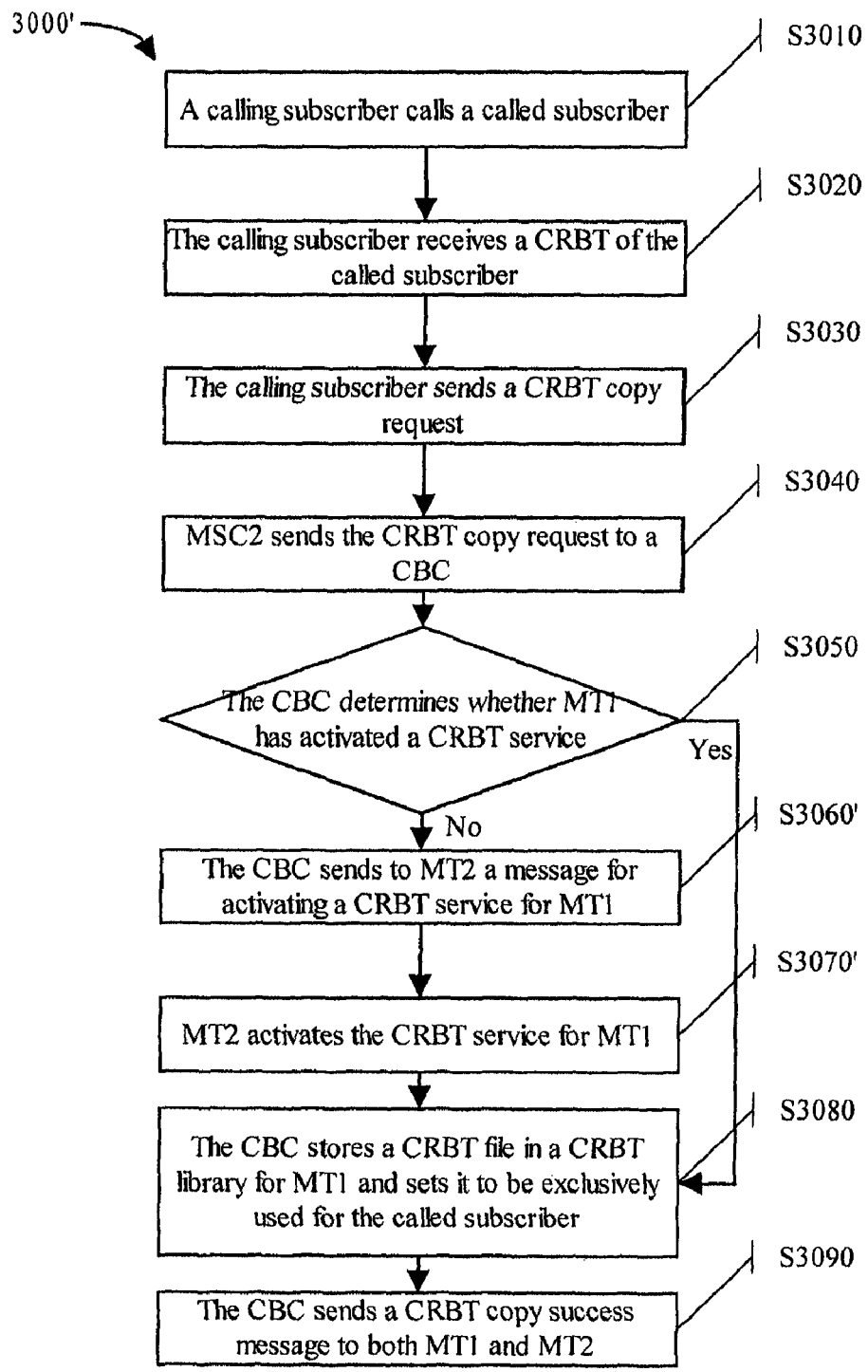
FIG. 4 illustrates a flowchart of a method for copying a CRBT according to a modification of the second embodiment of the present invention.

The flowchart 3000' in FIG. 4 illustrates a modification of the second embodiment. The modification differs from the second embodiment in that steps S3060 and S3070 are replaced with steps S3060' and S3070', and the called subscriber activates the CRBT service for the calling subscriber. Specifically, in step S3060', the CBC sends a message to MT2 to indicate that MT1 still does not activate the CRBT service and cannot copy the CRBT, and require the MT2 to make a response to activate the CRBT service for MT1. Next, in step S3070', MT2 responds to the above message and requests the CBC to activate the CRBT service for MT1. Then, the CBC activates the CRBT service for MT1. Preferably, after the CBC activates the CRBT service for MT1, it can also send a message to MT1 and/or MT2 to indicate that MT2 has successfully activated the CRBT service for MT1. Subsequently, steps S3080 and S3090 are executed to copy the CRBT for MT1 and send a CRBT copy success message. This is especially suitable for the case that during a communication procedure, the called subscriber knows that the calling subscriber likes the CRBT just played, and hopes the called subscriber to activate the CRBT service and copy the CRBT for him/her. Alternatively, in step 3070', the following operations may be added: after receiving the response message from MT2, the CBC can send MT1 a message again to require MT1 to confirm whether or not to allow MT2 to activate the CRBT service for MT1. If MT1 responds to confirm that MT2 is allowed to activate the CRBT service for MT1, the CBC will activate the CRBT service for MT1 and continue to perform the subsequent operations, otherwise the subsequent operations will not be performed and the CBC sends a message to MT2 to indicate that MT1 does not hope to activate the CRBT service, and thus the CRBT copy operation cannot be performed.

According to the modification, the called subscriber can activate the CRBT service for the calling subscriber so as to facilitate copying CRBT. In the modification, the called subscriber is chargeable. Alternatively, the calling subscriber may also be chargeable. For example, before the CRBT copy is completed, a CRBT copy confirming and charging message can be sent to MT1 and/or MT2 by the CBC to require a corresponding response, so as to determine which party will finally pay for the CRBT copy.

Figure 5:
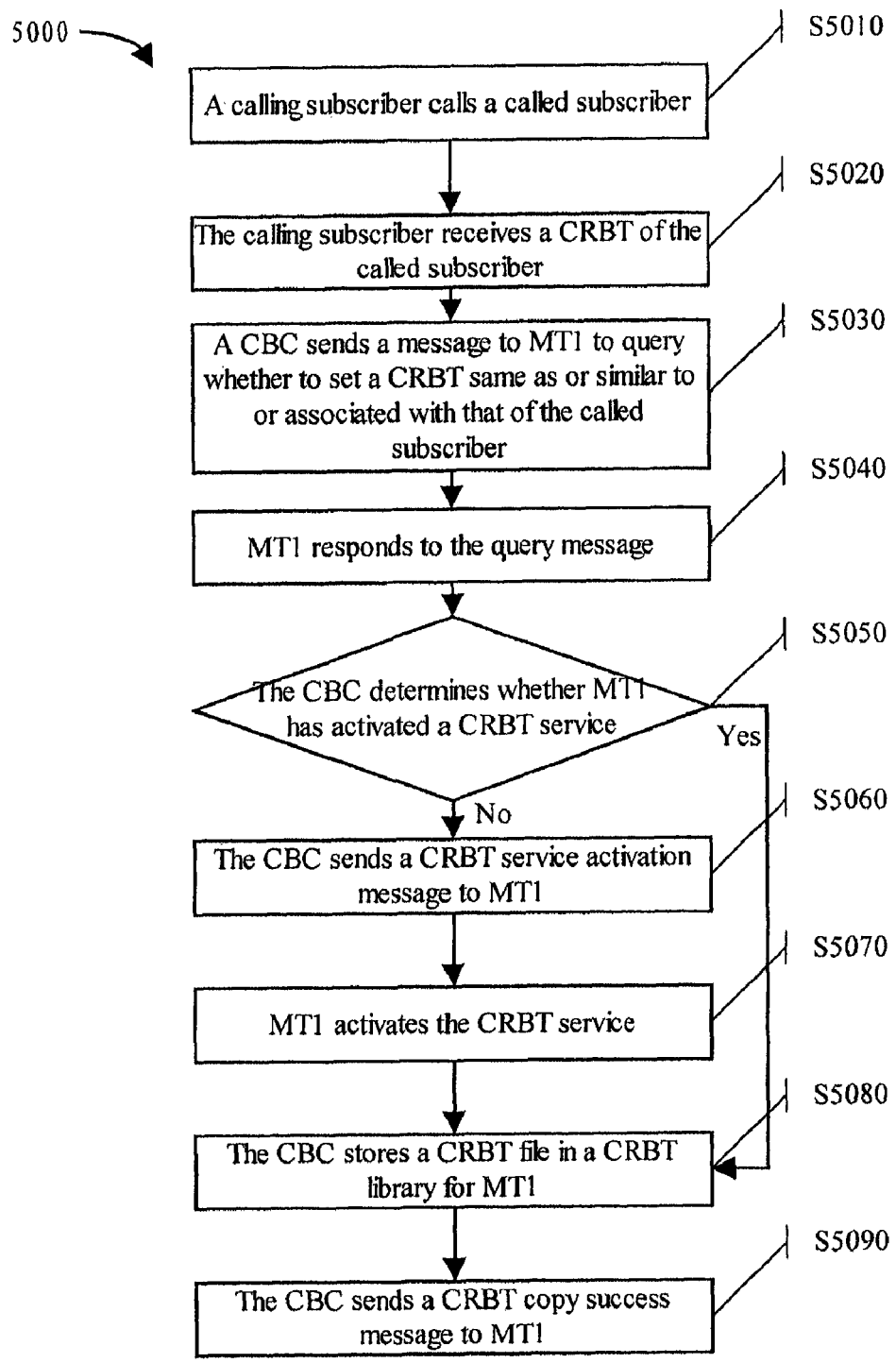
FIG. 5 illustrates a flowchart of a method for setting a CRBT according to a third embodiment of the present invention.

Next, the third embodiment of the present invention is described in reference to flowchart 5000 of FIG. 5. The third embodiment differs from the previous embodiments in that during or after the calling process, the CBC sends MT1 an inquiry message to request MT1 to set a CRBT same as or similar to that of MT2 heard in the calling process. The detailed process is as follows.

Firstly, in step S5010, MT1 initiates a call to MT2 via MSC1 and MSC2.

Next, in step S5020, MT1 receives the CRBT played by the CBC since MT2 already subscribed the CRBT service.

Next, in step S5030, during or after the calling process, the CBC sends MT1 a message to inquiry whether the calling subscriber hopes to set a CRBT same as that of the called subscriber just heard, or a similar or associated CRBT. The inquiry message may include various response options, such as "respond with "1*" to copy the same CRBT that is only received by the called subscriber", "respond with "2*" to set any other CRBT of the same style", "respond with "3*" to set any other CRBT of the same artist", etc. To be noted, the codes and their meanings listed herein are just examples.

Next, in step S5040, MT1 makes a response to the inquiry message. For example, "1*" is responded to indicate that MT1 wants to copy a CRBT same as that of the called subscriber and to be only received by the called subscriber when the called subscriber calls the calling subscriber.

Next, in step S5050, after receiving the response message from MT1, the CBC authenticates MT1 to judge whether MT1 already activated the CRBT service. Specifically, the CBC can search the phone number of MT1 in its database, and if the number is found, it means that MT1 already activated the CRBT service, otherwise MT1 has not activated the CRBT service. If the judgment result is "Yes", i.e., MT1 already activated the CRBT service, the procedure will go to step S5080, and if the judgment result is "No", the procedure will go to step S5060.

In step S5060, the CBC sends a CRBT service activation message to MT1.

Next, in step S5070, MT1 activates the CRBT service by responding to the CRBT service activation message sent by the CBC.

Next, in step S5080, the CBC sets a CRBT based on the response message from MT1. For example, as mentioned above, when MT1 responds with code "1*", the CBC stores a CRBT file same as that just heard by the calling subscriber into the CRBT library for MT1, preferably associates the serial number of the CRBT file with the phone number of MT1, and sets the CRBT file to be received only by MT2.

When MT1 responds with other options, the CBC can perform corresponding CRBT settings. For example, when MT1 responds with code "2*", the CBC can select from the CRBT library a piece of CRBT having the style same as that received by MT1 (e.g., Rap style), and set the selected CRBT into the CRBT library for MT1. In addition, the CBC can be further set so that, for example, when MT1 responds with code "2*!", the CBC may, after setting for MT1 a CRBT having the style same as that received by MT1, further set the CRBT to be received only by MT2. Alternatively, after selecting the CRBT, the CBC can play the CRBT for MT1, and sets the CRBT for MT1 after MT1 responds with a message to accept the CRBT; if MT1 responds with a message hoping to audition other CRBTs, the CBC continues to select another CRBT of the same style, and executes operations of audition and setting same as those described previously.

Next, after the CRBT is copied, the CBC can send a CRBT copy success message to MT1 in step 5090.

In this embodiment, MT1 and MT2 may belong to the same MSC. In this case, the CRBT copying process is same as the above process.

Thus, according to the embodiment, after calling the called subscriber, the calling subscriber can subsequently determine whether to copy a CRBT same as, similar to, or associated with the CRBT just heard based on the message from the CBC, thereby saving/facilitating the process of auditioning and selecting a CRBT by the calling subscriber.

Figure 6:
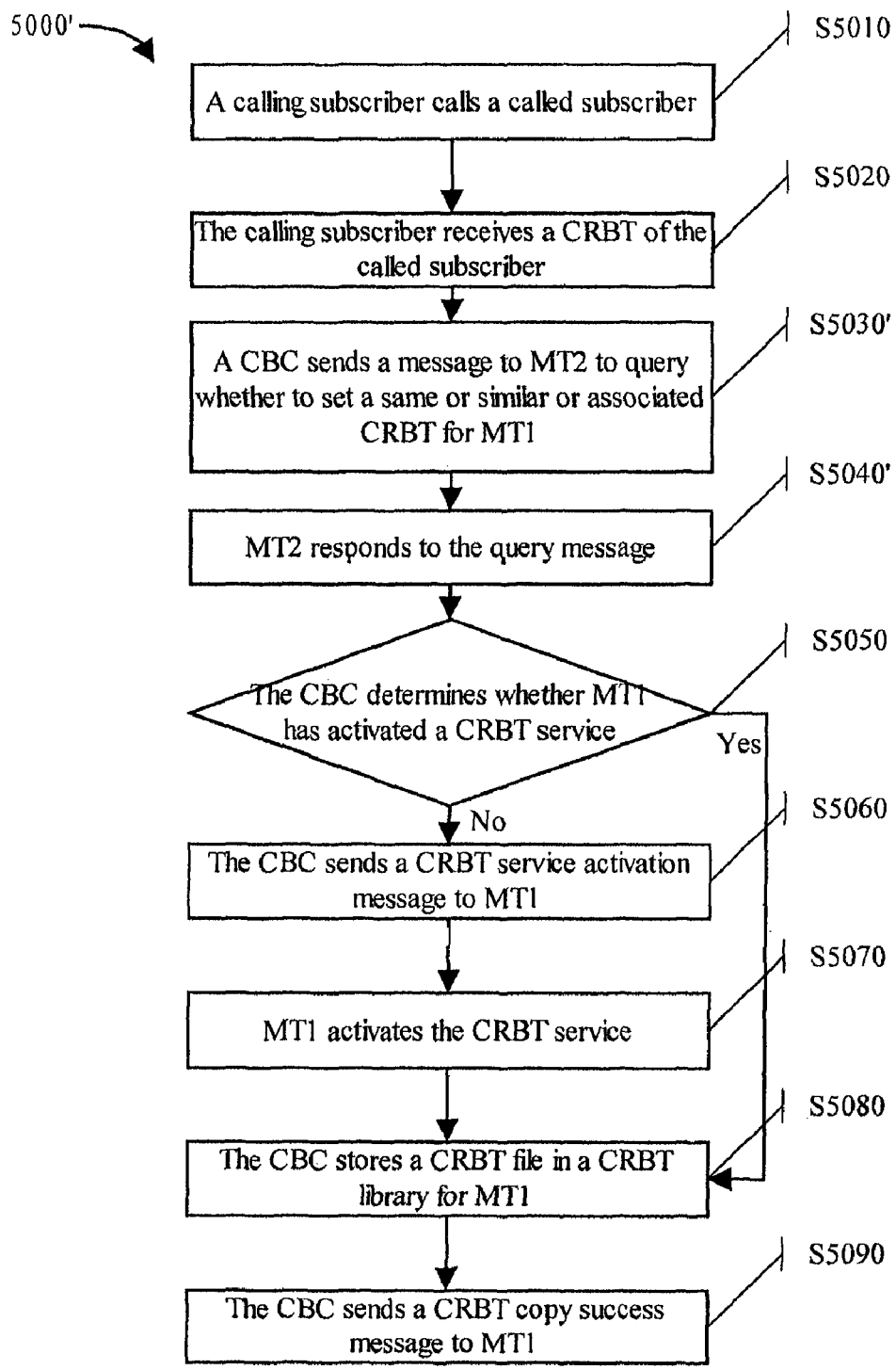
FIG. 6 illustrates a flowchart of a method for setting a CRBT according to a modification of the third embodiment of the present invention.

Flowchart 5000' in FIG. 6 illustrates a modification of the third embodiment. The modification differs from the third embodiment in that the CBC sends an inquiry message to MT2. Specifically, in step 5030', during or after the calling process, the CBC sends a message to MT2 to inquiry whether the called subscriber wants to set for the calling subscriber a CRBT same as, similar to or associated with that of the called subscriber just heard by the calling subscriber. The inquiry message may include various response options, such as "responding with 1# to copy, for the calling subscriber, the same CRBT that is only received by the called subscriber", "responding with 2# to set any other CRBT of the same style for the calling subscriber", "responding with 3# to set any other CRBT of the same artist for the calling subscriber", etc. To be noted, the codes and their meanings listed herein are just examples.

Next, in step 5040', MT2 makes a response to the inquiry message. For example, "1#" is responded to indicate that MT2 wants to copy for the calling subscriber, a CRBT which is same as that of MT2 and to be only received by the called subscriber when the called subscriber calls the calling subscriber. When MT2 responds with other options, the CBC can perform corresponding CRBT settings. For example, when MT2 responds with code "2#", the CBC can select from the CRBT library a piece of CRBT having the style same as that received by MT1 (e.g., Rap style), and set the selected CRBT into the CRBT library for MT1. In addition, the CBC can be further set so that, for example, when MT2 responds with code "2#!", the CBC may, after setting for MT1 a CRBT having the style same as that received by MT1, further set the CRBT to be received only by MT2. Alternatively, after selecting the CRBT, the CBC can play the CRBT for MT1, and sets the CRBT for MT1 after MT1 responds with a message to accept the CRBT; if MT1 responds with a message to indicate audition of other CRBTs, the CBC continues to select a CRBT of the same style, and executes operations of audition and setting same as those described previously.

The subsequent process is similar to that in the third embodiment, and herein is not described in details.

Thus, according to the embodiment, after the calling subscriber calls the called subscriber, the called subscriber can subsequently determine whether to copy for the calling subscriber, a CRBT same as, similar to, or associated with the CRBT just heard by the calling subscriber based on the inquiry message from the CBC and an evaluation from the calling subscriber during the communication process on the CRBT just heard, thereby saving/facilitating the process of auditioning and selecting CRBT by the calling subscriber.

Alternatively, as described in steps 3060' and 3070' in FIG. 4, the CRBT service can also be activated for MT1 by MT2 in that embodiment, and it is not described herein in details.

In the above embodiments described in reference to FIGS. 5 and 6, relevant information of a CRBT being played, such as "track name" and "artist", can be obtained by means of the TrackID™ technology of Sony Ericsson, in order to select a CRBT similar to or associated with the played CRBT. In addition, MT1 for example may also acquire information about the received CRBT by using the embedded TrackID™ application, in order to select and set a CRBT. The TrackID™ technology is a known application and herein is not described in details.

In the above embodiments, whether MT1 already activated the CRBT service is judged by the CBC. Alternatively, it may be possible to judge whether MT1 already activated the CRBT service by MSC1, to which MT1 belongs, detecting a Home Location Register (HLR) of MT1. This is well known by a person skilled in the art, and herein is not described in details.

Although the present invention is only illustrated with the above preferred embodiments, a person skilled in the art can easily make various changes and modifications based on the disclosure herein without departing from the invention scope defined by the accompanied claims. The description of the above embodiments is just exemplary, and will not limit the invention defined by the accompanied claims and their equivalents.

It will be appreciated that various portions of the present invention can be implemented in hardware, software, firmware, or a combination thereof. In the described embodiments, a number of the steps or methods may be implemented in software or firmware that is stored in a memory and executed by a suitable instruction execution system. If implemented in hardware, for example, like in another embodiment, implementation may be with any or a combination of the following technologies, which are all well known in the art: discrete logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

Any process or method descriptions or blocks in the flow diagram or otherwise described herein may be understood as representing modules, fragments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood reasonably by those skilled in the art of the present invention.

The logic and/or steps represented in the flowcharts or otherwise described herein, for example, may be considered an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this Specification, a "computer-readable medium" can be any means that can contain, store, communicate, propagate, or transport the program for use by or in combination with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection portion (electronic device) having one or more wires, a portable computer diskette (magnetic device), a random access memory (RAM) (electronic device), a read-only memory (ROM) (electronic device), an erasable programmable read-only memory (EPROM or Flash memory) (electronic device), an optical fiber (optical device), and a portable compact disc read-only memory (CDROM) (optical device). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The above description and drawings depict the various features of the invention. It shall be appreciated that the appropriate computer code could be prepared by a person skilled in the art to carry out the various steps and processes described above and illustrated in the drawings. It also shall be appreciated that the various terminals, computers, servers, networks and the like described above may be of any type and that the computer code may be prepared to carry out the invention using such apparatus in accordance with the disclosure hereof.

Specific embodiments of the present invention are disclosed herein. A person skilled in the art will easily recognize that the invention may have other applications under other environments. In the fact, many embodiments and implementations are possible. The accompanied claims are in no way intended to limit the scope of the present invention to the specific embodiments described above. In addition, any recitation of "device configured to . . . " is intended to evoke a device-plus-function reading of an element and a claim, whereas, any element that does not specifically use the recitation "device configured to . . . ", is not intended to be read as a device-plus-function element, even if the claim otherwise comprises the word "device".

Although the present invention has been illustrated and described with respect to a certain preferred embodiment or multiple embodiments, it is obvious that equivalent alterations and modifications will occur to a person skilled in the art upon the reading and understanding of this specification and the accompanied drawings. In particular regard to the various functions performed by the above elements (components, assemblies, devices, compositions, etc.), the terms (including a reference to a "device") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the present invention. In addition, although a particular feature of the invention may have been described above with respect to only one or more of several illustrated embodiments, such feature may be combined with one or more other features of the other embodiments, as may be desired and advantageous for any given or particular application.

What is claimed is:

1. A method for setting a Coloring Ring Back Tone (CRBT), comprising the steps of:

initiating a call to a called terminal and receiving a CRBT subscribed by the called terminal sent from a CRBT Service Center (CBC), by a calling terminal in a communication network;

during the process of playing the CRBT or the communication process or after the call is ended, authenticating the calling terminal by the communication network in response to a CRBT setting request message sent by the calling terminal or the called terminal actively or upon an inquiry from the communication network, so as to judge whether the calling terminal already activated a CRBT service;

if it is judged in the step of authenticating that the calling terminal has not activated a CRBT service, sending, by the communication network, a CRBT service activation message to the calling terminal to instruct the calling terminal to activate the CRBT service, and then activating, by the calling terminal, the CRBT service through a response to the CRBT service activation message, or sending, by the communication network, to the called terminal a message about activating the CRBT service for the calling terminal, and then activating, by the called terminal, the CRBT service for the calling terminal through a response to the message; and if it is judged in the step of authenticating that the calling terminal already activated the CRBT service, or the CRBT service is activated for the calling terminal in the step of activating the CRBT service, instructing, by the communication network, the CBC to set a CRBT same as or at least substantially the same as or associated with the CRBT received by the calling terminal into a CRBT library for the calling terminal;

wherein the CRBT setting request message is sent by the calling terminal or the called terminal responding to an inquiry message from the communication network after the call is ended, wherein the inquiry message prompts whether to set a CRBT same as or associated with that received by the calling terminal into the CRBT library for the calling terminal.

2. A method for setting a Coloring Ring Back Tone (CRBT), comprising the steps of:

initiating a call to a called terminal and receiving a CRBT subscribed by the called terminal sent from a CRBT Service Center (CBC), by a calling terminal in a communication network;

during the process of playing the CRBT or the communication process or after the call is ended, authenticating the calling terminal by the communication network in response to a CRBT setting request message sent by the calling terminal or the called terminal actively or upon an inquiry from the communication network, so as to judge whether the calling terminal already activated a CRBT service;

if it is judged in the step of authenticating that the calling terminal has not activated a CRBT service, sending, by the communication network, a CRBT service activation message to the calling terminal to instruct the calling terminal to activate the CRBT service, and then activating, by the calling terminal, the CRBT service through a response to the CRBT service activation message, or sending, by the communication network, to the called terminal a message about activating the CRBT service for the calling terminal, and then activating, by the called terminal, the CRBT service for the calling terminal through a response to the message; and if it is judged in the step of authenticating that the calling terminal already activated the CRBT service, or the CRBT service is activated for the calling terminal in the step of activating the CRBT service, instructing, by the communication network, the CBC to set a CRBT same as or at least substantially the same as or associated with the CRBT received by the calling terminal into a CRBT library for the calling terminal;

wherein the CRBT setting request message is a message sent, during the calling process, through pressing a specific key of the calling terminal or the called terminal, or operating on a specific menu of the calling terminal or the called terminal, or upon the setting of the calling terminal or the called terminal, and the message instructs to copy a CRBT same as that received by the calling terminal into the CRBT library for the calling terminal, and set the CRBT to be only received by the called terminal when the called terminal calls the calling terminal.

3. The method according to claim 1, wherein the CRBT setting request message instructs to copy a CRBT same as that received by the calling terminal into the CRBT library for the calling terminal, and set the CRBT to be only received by the called terminal when the called terminal calls the calling terminal.

4. The method according to claim 2, wherein in the step of setting the CRBT, the CBC copies the CRBT same as that received by the calling terminal into the CRBT library for the calling terminal, and sets the CRBT to be only received by the called terminal when the called terminal calls the calling terminal.

5. The method according to 1, wherein the CRBT setting request message instructs to copy a CRBT at least substantially the same as or associated with that received by the calling terminal into the CRBT library for the calling terminal.

6. The method according to claim 5, wherein in the step of setting the CRBT, the CBC copies the CRBT at least substantially the same as or associated with that received by the calling terminal into the CRBT library for the calling terminal.

7. The method according to claim 5, wherein the CRBT setting request message further instructs to set the CRBT at least substantially the same as or associated with that received by the calling terminal to be only received by the called terminal when the called terminal calls the calling terminal.

8. The method according to claim 7, wherein in the step of setting the CRBT, the CBC sets the CRBT at least substantially the same as or associated with that received by the calling terminal into the CRBT library for the calling terminal, and sets the CRBT to be only received by the called terminal when the called terminal calls the calling terminal.

9. The method according to claim 1, wherein in the step of setting the CRBT, the CBC sets a serial number of the CRBT same as or at least substantially the same as or associated with that received by the calling terminal to the CRBT library for the calling terminal.

10. The method according to claim 1, wherein the step of authenticating is performed by the CBC.

11. The method according to claim 10, wherein the step of authenticating comprises:

searching, by the CBC, in a database thereof based on the telephone number of the calling terminal, and if the telephone number of the calling terminal exists in the database, judging that the calling terminal already activated the CRBT service, otherwise judging that the calling terminal has not activated the CRBT service.

12. The method according to claim 1, after the step of setting the CRBT, further comprising:

sending, by the CBC, a CRBT setting success message to the calling terminal or the called terminal.

13. The method according to claim 1, wherein the communication network is a mobile communication network, and the calling terminal and the called terminal are mobile communication terminals.

14. The method according to claim 13, wherein the step of authenticating comprises:

detecting, by a mobile switching center of the calling terminal, a home location register of the calling terminal to judge whether the calling terminal already activated the CRBT service.

15. The method according to claim 1, wherein the called terminal is charged for the CRBT service activation fee in case that the CRBT setting request message is sent by the called terminal.

16. The method according to claim 1, wherein in the step of activating the CRBT service, after the called terminal responds to the CRBT service activation message so as to activate the CRBT service for the calling terminal, the CBC further sends a message to the calling terminal to require the calling terminal to determine whether to activate the CRBT service, and after the calling terminal responds with a message to decide to activate the CRBT service, activates the CRBT service for the calling terminal.

17. The method according to claim 1, wherein the CRBT is an audio CRBT or a video CRBT.

18. The method according to claim 1, wherein the communication network is a fixed-line telephone network, and the calling terminal and the called terminal are fixed-line telephone terminals.

19. The method according to claim 3, wherein in the step of setting the CRBT, the CBC copies the CRBT same as that received by the calling terminal into the CRBT library for the calling terminal, and sets the CRBT to be only received by the called terminal when the called terminal calls the calling terminal.

* * * * *